(12) United States Patent
Hikida et al.

(10) Patent No.: US 9,120,370 B2
(45) Date of Patent: Sep. 1, 2015

(54) DRIVE APPARATUS FOR AN ELECTRIC AUTOMOBILE

(75) Inventors: Masafumi Hikida, Kanagawa (JP);
Yasuyuki Matsuda, Kanagawa (JP);
Kazutaka Tanaka, Kanagawa (JP);
Daisuke Gunji, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/347,373

(22) PCT Filed: Feb. 29, 2012

(86) PCT No.: PCT/JP2012/055117
§ 371 (c)(1),
(2), (4) Date: May 14, 2014

(87) PCT Pub. No.: WO2013/046748
PCT Pub. Date: Apr. 4, 2013

(65) Prior Publication Data
US 2014/0243136 A1  Aug. 28, 2014

(30) Foreign Application Priority Data

Sep. 26, 2011 (JP) .................................. 2011-208415

(51) Int. Cl.
*B60K 1/02* (2006.01)
*F16H 3/72* (2006.01)
(Continued)

(52) U.S. Cl.
CPC .................. *B60K 1/02* (2013.01); *B60L 11/123* (2013.01); *B60L 11/14* (2013.01); *B60L 15/20* (2013.01);
(Continued)

(58) Field of Classification Search
CPC .......... B60K 1/02; B60K 6/365; B60L 11/14; F16H 3/724; F16H 2200/2007; F16H 2200/2033
USPC ........................................ 475/5, 10, 323, 325
See application file for complete search history.

(56) References Cited

U.S. PATENT DOCUMENTS 5,577,973 A * 11/1996 Schmidt ............................ 475/5
6,007,450 A * 12/1999 Raghavan et al. ............. 475/286
(Continued)

FOREIGN PATENT DOCUMENTS

| JP | 6011750 A | 1/1985 |
| JP | 5104964 A | 4/1993 |

(Continued)

OTHER PUBLICATIONS

International Search Report and Written Opinion dated May 1, 2012, from the corresponding PCT/JP2012/055117.

*Primary Examiner* — Roger Pang
(74) *Attorney, Agent, or Firm* — Katten Muchin Rosenman LLP

(57) ABSTRACT

A drive apparatus for an electric automobile in which a planetary gear transmission 12 is assembled for which it is possible to lengthen the traveling distance per one electric charge, and thus improve the convenience of the electric automobile. A planetary gear transmission 12 comprises a first single-pinion planetary gear mechanism 16 and a second double-pinion planetary gear mechanism 17, and after changing the power from first and second electric motors 10, 11 by a desired gear ratio, transmits the power to a driven-side rotating shaft 15. A one-way clutch 18 is provided between a first carrier 19 and a portion 27 that is fastened to the vehicle so as to allow the first carrier 19 to rotate in a specified direction and prevent the first carrier 19 from rotating in a direction opposite the specified direction.

6 Claims, 6 Drawing Sheets

(51) Int. Cl.
*B60L 11/12* (2006.01)
*B60L 11/14* (2006.01)
*B60L 15/20* (2006.01)

(52) U.S. Cl.
CPC ............. *F16H 3/724* (2013.01); *B60L 2210/30* (2013.01); *B60L 2210/40* (2013.01); *B60L 2240/421* (2013.01); *B60L 2240/423* (2013.01); *B60L 2270/145* (2013.01); *F16H 2200/0021* (2013.01); *F16H 2200/2007* (2013.01); *F16H 2200/2033* (2013.01); *Y02T 10/6217* (2013.01); *Y02T 10/648* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 2009/0176610 A1* | 7/2009 | Conlon | 475/5 |
| 2010/0006357 A1* | 1/2010 | Oba et al. | 180/65.25 |
| 2011/0143875 A1* | 6/2011 | Ono et al. | 475/5 |
| 2013/0151048 A1* | 6/2013 | Kwon et al. | 701/22 |

FOREIGN PATENT DOCUMENTS

| | | |
|---|---|---|
| JP | 5116542 A | 5/1993 |
| JP | 2006022879 A | 1/2006 |
| JP | 2008131686 A | 6/2008 |
| JP | 2010090947 A | 4/2010 |
| JP | 2010223298 A | 10/2010 |

* cited by examiner

DRIVE APPARATUS FOR AN ELECTRIC AUTOMOBILE

TECHNICAL FIELD

The present invention relates to a drive apparatus for an electric automobile that changes the speed (reduces the speed) of output from an electric motor and transmits that power to the drive wheels.

BACKGROUND ART

In recent years, as there is a reduction in the dependence on fossil fuels, research of electric automobiles is advancing, and in part electric automobiles are already being put into practical use. The electric motor, which is the power source of an electric automobile, is different from an internal combustion engine that operates by directly burning fossil fuel, and typically, because the characteristics of torque and rotation speed of the output shaft such as when generating maximum torque at startup are preferable for an automobile, it is not absolutely necessary for an electric automobile to have a transmission that is necessary in a typical automobile that uses an internal combustion engine as the drive source. However, even in the case of an electric automobile, by providing a transmission, it is possible to improve the accelerating performance and high-speed performance. More specifically, by providing a transmission, the relationship between the traveling speed and the acceleration of the vehicle is close to that of a gasoline engine that has a transmission in the power transmission line, and it is possible to make operation of the vehicle smooth. This point will be explained with reference to FIG. 5.

For example, when a power transmission apparatus having a large reduction ratio is provided between the output shaft of the electric motor, which is the drive source for an electric automobile, and the input section of a differential gear that is connected to the drive wheels, the relationship between the acceleration (G) and the traveling speed (km/h) of the electric automobile is as the left half section of the solid line "a" in FIG. 5 that is continuous with the chain line "b". In other words, the acceleration performance at low speed is excellent, however, traveling at high speed is not possible. On the other hand, when a power transmission apparatus having a small reduction ratio is provided between the output shaft and the input section, the relationship is as the chain line "c" in FIG. 5 that is continuous with the right half section of the solid line "a". In other words, high-speed travel is possible, however, acceleration performance at low speed is lost. However, by providing a transmission between the output shaft and the input section and changing the reduction ratio of the transmission according to the vehicle speed, it becomes possible to obtain the characteristic such as illustrated by the left half section and right half section of the solid line "a". This characteristic is nearly the same as that of a typical gasoline engine having the same output as indicated by the dashed line "d", and in regards to the acceleration performance and the high-speed performance, by providing a transmission, it can be seen that an electric automobile can obtain the same performance as that of a gasoline engine.

FIG. 6 illustrates construction disclosed in JP 2006-022879 (A) as an example of conventional construction of a drive apparatus for an electric automobile in which a transmission is provided between the output shaft of the electric motor and the input section of a differential gear that is connected to the drive wheels. This drive apparatus for an electric automobile transmits the rotation from the output shaft of the electric motor 1 to a rotation transmission apparatus 3 by way of a transmission 2, and rotates and drives a pair of left and right drive wheels. A pair of gear transmission mechanisms 6a, 6b having different reduction ratios are provided between a rotating shaft 4 on the driving side that is concentric with the output shaft of an electric motor 1 and a rotating shaft 5 on the driven side. By switching a pair of clutch mechanisms 7a, 7b, it is possible to set one of the gear transmission mechanisms 6a (6b) in a power transmittable state, and switch the reduction ratio between the rotating shaft 4 on the driving side and the rotating shaft 5 on the driven side in two steps, large and small.

In other words, one clutch mechanism 7a of the clutch mechanisms 7a, 7b is set to be controllable by an actuator, and the other clutch mechanism 7b is set as an overrunning clutch that is disconnected when the rotation speed is a fixed value or greater. With the one clutch mechanism 7a in a connected state, and the other clutch mechanism 7b disconnected (idling), the rotation torque from the rotating shaft 4 on the driving side is transmitted to the rotating shaft 5 on the driven side by way of the gear transmission mechanism 6a, which is one of the gear transmission mechanisms 6a, 6b, that has a small reduction ratio. On the other hand, when the one clutch mechanism 7a is disconnected, and the other clutch mechanism 7b is connected, the rotation torque from the rotating shaft 4 on the driving side is transmitted to the rotating shaft 5 on the driven side by way of the gear transmission mechanism 6b having a large reduction ratio. The rotation of the rotating shaft 5 on the driven side is transmitted to the input section of the differential gear 8 by the rotation transmission apparatus 3, and the output shafts 9a, 9b that support the pair of left and right drive wheels are rotated and driven.

In the case of this kind of conventional construction, a pair of gear transmission mechanisms 6a, 6b are provided between a rotating shaft 4 on the driving side and a rotating shaft 5 on the driven side that are parallel with each other and separated from each other in the radial direction, so there is a problem that the drive device for an electric automobile will become large. Moreover, one clutch mechanism 7a of the clutch mechanisms 7a, 7b comprises an actuator for switching the engaged/disengaged state thereof, so there is a possibility that the weight of the drive apparatus for an electric automobile will increase. On the other hand, in order to improve the convenience of an electric automobile, and in order to lengthen the distance travelled per one charge, it is essential that the drive apparatus for an electric automobile be made compact and lightweight, and that the amount of power consumed per distance travelled be reduced.

Technology is disclosed in JP 2010-090947 (A) and JP 2010-223298 (A) as technology for making the drive apparatus for an electric automobile compact, in which rotating shafts that are concentric with the pipe-shaped output shaft of an electric motor and connected to a transmission having different reduction ratios are provided on inner-diameter side and the outer-diameter side of the output shaft of the electric motor, and by way of a pair of clutches, one of either the rotating shaft on the inner-diameter side or the rotating shaft on the outer-diameter side is rotated and driven. However, even in the construction disclosed in this patent literature, a heavy actuator is necessary for switching the engaged/disengaged state of the clutches, and so from the aspect of reducing the weight of the drive apparatus for an electric automobile, there is still room for improvement.

RELATED LITERATURE

Patent Literature

[Patent Literature 1] JP 2006-022879 (A)
[Patent Literature 2] JP 2010-090947 (A)
[Patent Literature 3] JP 2010-223298 (A)

SUMMARY OF THE INVENTION

Problem to be Solved by the Invention

Taking into consideration the situation described above, the object of the present invention is to provide a drive apparatus for an electric automobile that has compact and lightweight construction, and that is capable of improving the convenience of the electric automobile by lengthening the traveling distance per charge.

Means for Solving the Problems

The drive apparatus for an electric automobile of the present invention has a pair of electric motors each having an output shaft; a planetary gear transmission having a first and second driving-side rotating shafts that are respectively rotated and driven by either one of the output shafts of the electric motors, and a driven-side rotating shaft; and a rotation transmission apparatus for transmitting the rotation of the driven-side rotating shaft of the planetary gear transmission to a pair of left and right drive wheels.

The planetary gear transmission has the first and second driving-side rotating shafts and the driven-side rotating shaft as well as first and second planetary gear mechanisms that are separated in the axial direction and are concentric with each other and a clutch apparatus.

More specifically, the first planetary gear mechanism is a single-pinion planetary gear mechanism that comprises: a first carrier, a first sun gear, first planet gears and a first ring gear, the first planet gears being supported by the first carrier so as to be able to rotate and engaging with both the first sun gear and the first ring gear. The first sun gear is provided in the middle section in the axial direction of the first driving-side rotating shaft so as to be rotated and driven by the first driving-side rotating shaft, and the first ring gear is provided so as to be rotated and driven by the second driving-side rotating shaft.

Moreover, the second planetary gear mechanism is a double-pinion planetary gear mechanism that comprises: a second carrier, a second sun gear, second and third planet gears; and a second ring gear, the second and third planet gears being supported by the second carrier so as to be able to rotate and engaging with each other to form a pair, the second planet gears that are placed on the inner diameter side engaging with the second sun gear, and the third planet gears that are placed on the outer diameter side engaging with the second ring gear. The second sun gear is provided in the end section of the first driving-side rotating shaft so as to be rotated and driven by the first driving-side rotating shaft, the second carrier is provided so as to rotate in synchronization with the first ring gear, and the driven-side rotating shaft is rotated and driven by the second ring gear.

The clutch apparatus changes between a state where the first carrier is prevented from rotating with respect to a portion that is fastened to the vehicle, and a state where the rotation of the first carrier is allowed. In a low-speed mode state having a large reduction ratio, the clutch apparatus prevents the first carrier from rotating with respect to the portion fastened to the vehicle, and power that is inputted to the first ring gear is transmitted to the first sun gear, and in a high-speed mode state having a small reduction ratio, the clutch apparatus allows the first carrier to rotate with respect to the portion that is fastened to the vehicle, and power that is inputted to the first ring gear is not transmitted to the first sun gear.

Alternatively, the first planetary gear mechanism is a double-pinion planetary gear mechanism that comprises: a first carrier, a first sun gear, first and second planet gears and a first ring gear, the first and second planet gears being supported by the first carrier so as to be able to rotate and engaging with each other to form a pair, the first planet gears that are placed on the inner diameter side engaging with the first sun gear, and the second planet gears that are placed on the outer diameter side engaging with the first ring gear. The first sun gear is provided in the middle section in the axial direction of the first driving-side rotating shaft so as to be rotated and driven by the first driving-side rotating shaft, and the first ring gear is provided so as to be rotated and driven by the second driving-side rotating shaft. On the other hand, the second planetary gear mechanism is a single-pinion planetary gear that comprises: a second carrier, a second sun gear, third planet gears; and a second ring gear, the third planet gears being supported by the second carrier so as to be able to rotate and engaging with both the second sun gear and the second ring gear. The second sun gear is provided in the end section of the first driving-side rotating shaft so as to be rotated and driven by the first driving-side rotating shaft, the second carrier is provided so as to rotate in synchronization with the first ring gear, and the driven-side rotating shaft is rotated and driven by the second ring gear.

Preferably, the clutch apparatus is provided between the first carrier and the portion that is fastened to the vehicle, and is a one-way clutch that, when the vehicle is traveling forward and the first carrier rotates in the direction that the driven-side rotating shaft rotates, allows the first carrier to rotate with respect to the portion that is fastened to the vehicle; and when the vehicle is traveling forward and the first carrier has a tendency to rotate in the opposite direction from the direction that the driven-side rotating shaft rotates, prevents the first carrier from rotating with respect to the portion that is fastened to the vehicle. Preferably, this one-way clutch is a sprag clutch.

Preferably, when the vehicle is traveling forward in the high-speed mode state, the rotation direction and rotation speed of the first and second electric motor are the same. Moreover, the step ratio of the planetary gear transmission, which is the total reduction ratio in the low-speed mode state divided by the total reduction ratio in the high-speed mode state, is 2 or near 2, and more specifically, the step ratio is preferably within the range of 1.8 to 2.2 or further preferably is 2.

In construction where the first planetary gear mechanism is a single-pinion planetary gear mechanism and the second planetary gear mechanism is a double-pinion planetary gear mechanism, when the vehicle is traveling forward at a constant speed in the low-speed mode state, the rotation directions of the first and second electric motor are opposite each other, and the size of the rotation torque of the first and second electric motor can be made the same, and the planet ratio of the first planetary gear mechanism is no less than 2.8 and no greater than 3.2, and the planet ratio of the second planetary gear mechanism is no less than 1.9 and no greater than 2.1.

On the other hand, in construction where the first planetary gear mechanism is a double-pinion planetary gear mechanism and the second planetary gear mechanism is a single-pinion planetary gear mechanism, when the vehicle is traveling forward at a constant speed in the low-speed mode state, the rotation directions of the first and second electric motor are opposite each other, and the size of the rotation torque of the first and second electric motor can be made the same, and the planet ratio of the first planetary gear mechanism is no less than 2.8 and no greater than 3.2, and the planet ratio of the second planetary gear mechanism is no less than 1.9 and no greater than 2.1.

Advantageous Effect of the Invention

With the present invention, constructed as described above, it is possible to make the drive apparatus for an electric automobile more compact and lightweight. In other words, a planetary gear transmission that has a pair of planetary gear mechanisms is used as the transmission mechanism, so it is possible to disperse and transmit power to a plurality of planet gears, it is possible to keep the torque transmission capacity per one planet gear low, and when compared with the case of using a transmission using a typical gear mechanism, it is possible to make the transmission more compact and lightweight, and thus it is possible to make the drive apparatus for an automobile more compact and lightweight. Furthermore, by using a one-way clutch and preferably a sprag clutch as the clutch apparatus, it is possible to select between a low-speed mode and high-speed mode having different reduction ratios, by controlling the output (rotation direction and rotation speed) of a pair of electric motors, and having the one-way clutch switch between an engaged or disengaged state for transmitting power between the first sun gear and first ring gear of the first planetary gear mechanism. Therefore, there is no need for an actuator for switching the clutch apparatus, and thus it is possible to make the drive apparatus for an electric automobile even more compact and lightweight.

MODES FOR CARRYING OUT THE INVENTION

Example 1

Figure 1:
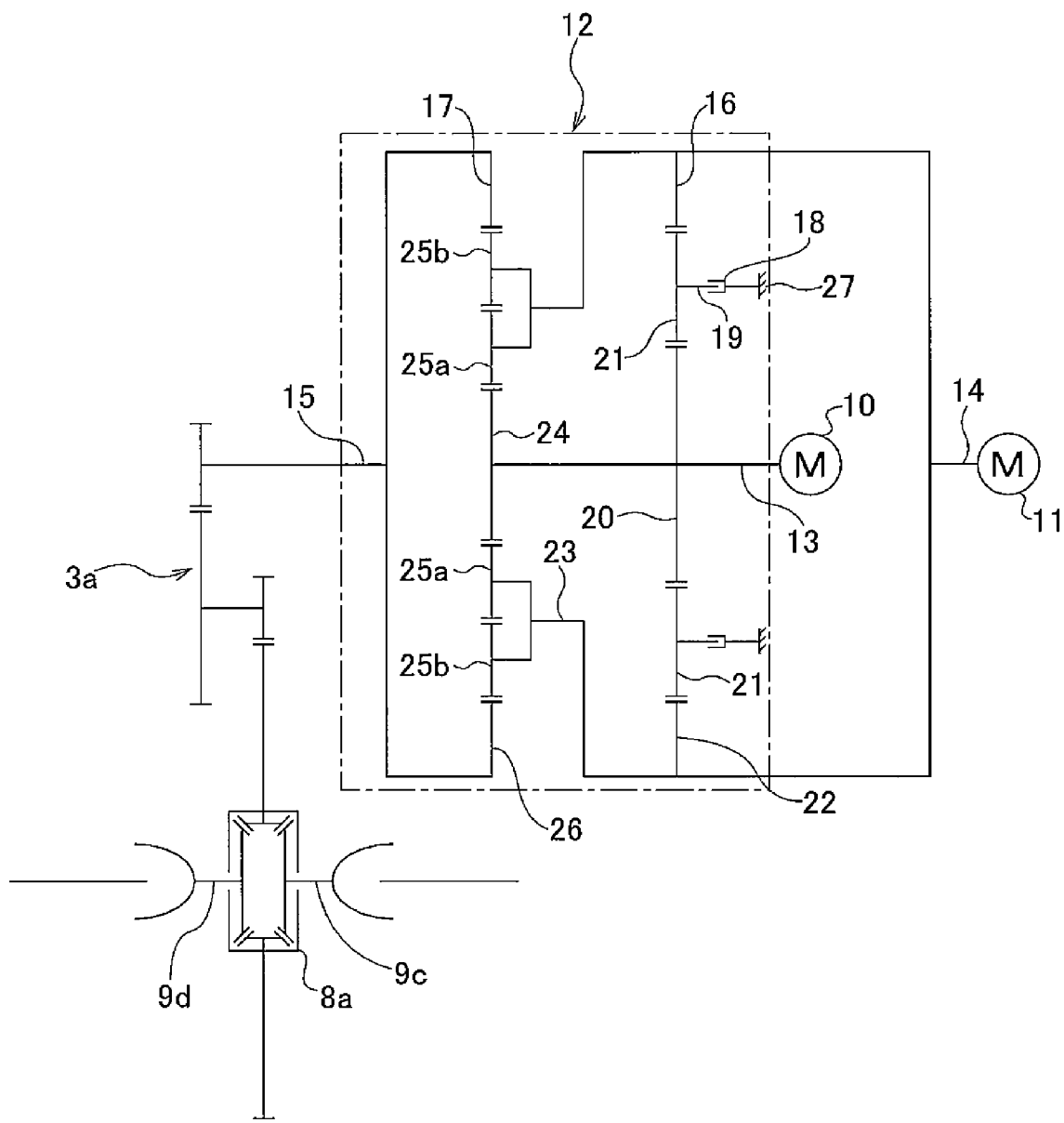
FIG. 1 is a cross-sectional drawing schematically illustrating a first example of an embodiment of the present invention.
Figure 2:
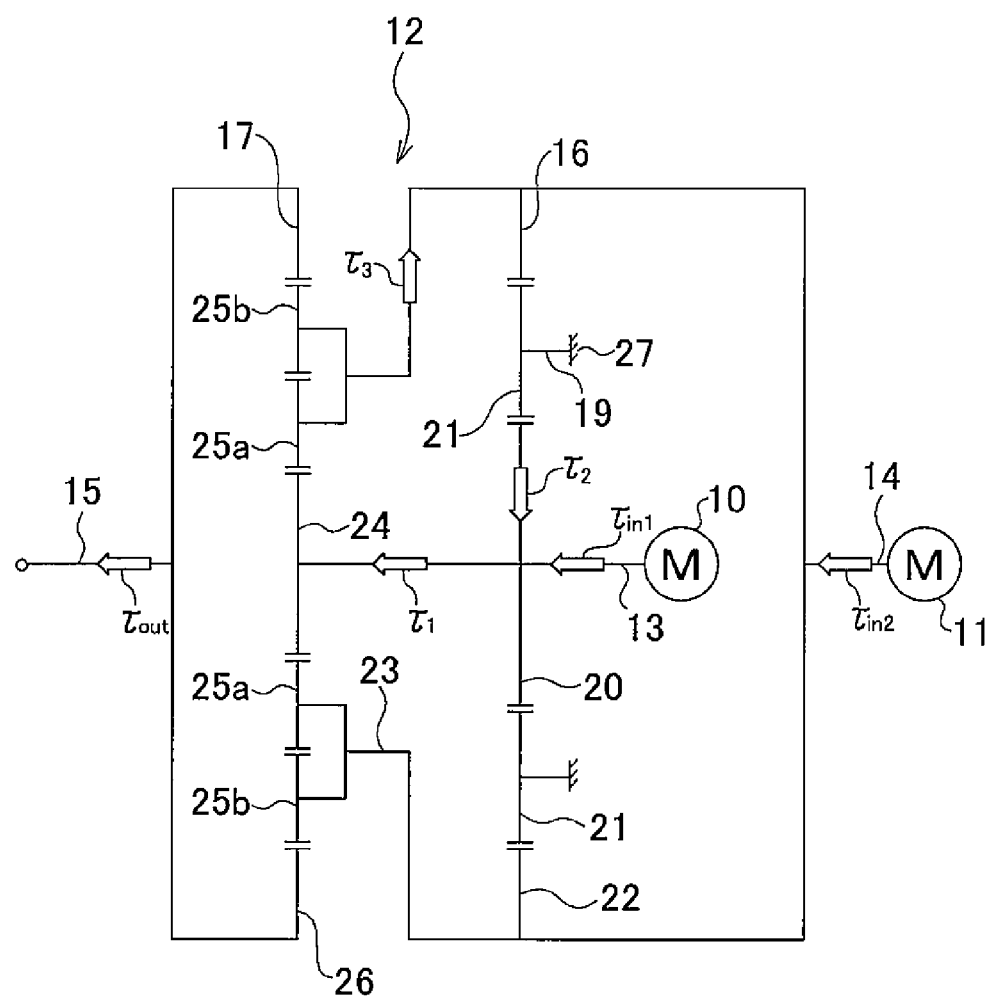
FIG. 2 is a cross-sectional view schematically illustrating the portion of a planetary gear transmission that performs torque transmission in the low-speed mode that has been removed from the apparatus of the first example.
Figure 3:
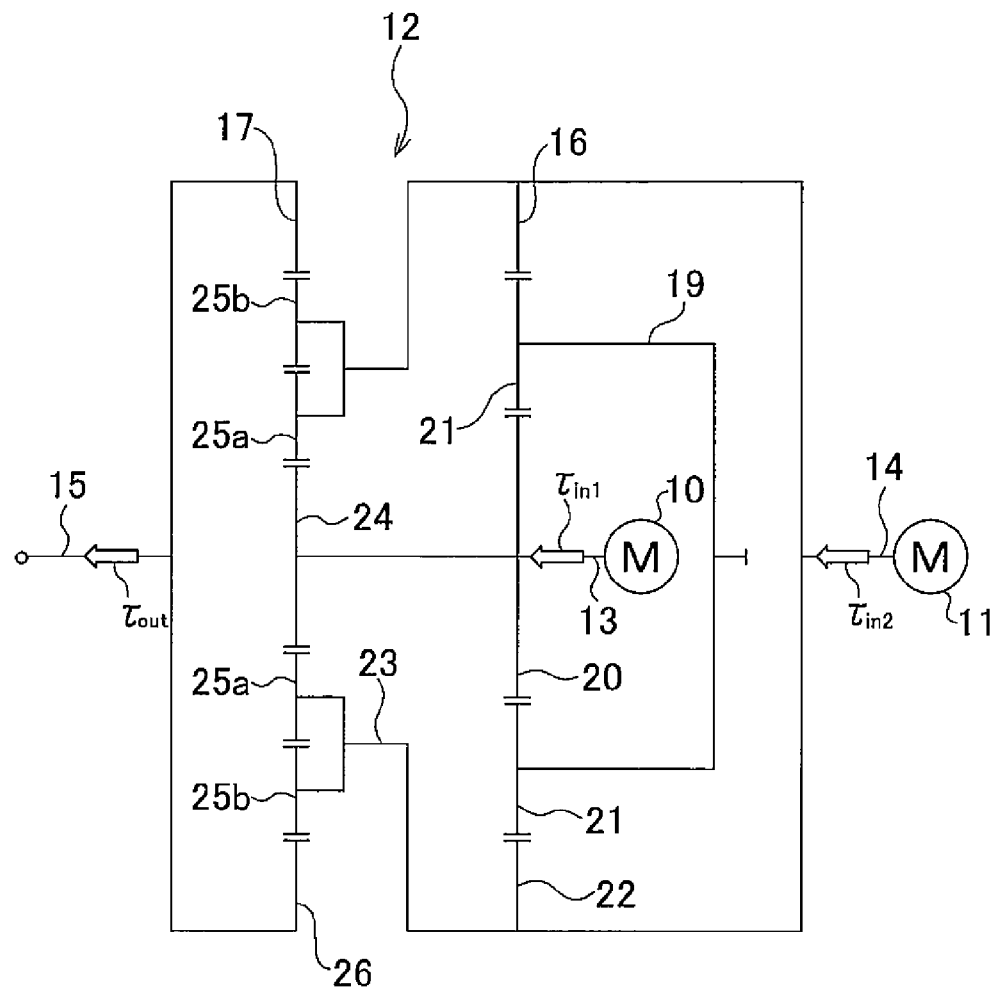
FIG. 3 is a cross-sectional view schematically illustrating the portion of a planetary gear transmission that performs torque transmission in the high-speed mode that has been removed from the apparatus of the first example.

FIG. 1 to FIG. 3 illustrate a first example of an embodiment of the present invention. The drive apparatus for an electric automobile of this example comprises a first electric motor 10, a second electric motor 11, a planetary gear transmission 12, and a rotation transmission apparatus 3a. The first motor 10 and the second motor 11 are arranged so as to be concentric with each other, and by each rotating and driving an output shaft, they respectively rotate and drive a first driving-side rotating shaft 13 and second driving-side rotating shaft 14 of the planetary gear transmission 12 that is provided so as to be concentric with these output shafts.

The planetary gear transmission 12 is located between the first electric motor 10 and the second electric motor 11 and the rotation transmission apparatus 3a, and after changing the speed of the power from the electric motors 10, 11 by a desired gear ratio, transmits that power to the rotation transmission apparatus 3a by way of a driven-side rotating shaft 15. The planetary gear transmission 12 comprises the first driving-side rotating shaft 13 and second driving-side rotating shaft 14 that are separated in the axial direction and concentric with the output shafts of the first electric motor 10 and second electric motor 11, as well as a driven-side rotating shaft 15, a first planetary gear mechanism 16 and second planetary gear mechanism 17, and a one-way clutch 18.

The first planetary gear mechanism 16 comprises a first carrier 19, a first sun gear 20, a plurality of first planet gears 21, and a first ring gear 22. The first planetary gear mechanism 16 is a single pinion planetary gear mechanism in which the first planet gears 21, which are supported by the first carrier 19 so as to be able to rotate, engage with both the first sun gear 20 and the first ring gear 22. The first sun gear 20 is integrally provided with the output shaft of the first electric motor 10, is located in the middle section in the axial direction of the first driving-side rotating shaft 13 and is rotated and driven by this first driving-side rotating shaft 13. In other words, the first sun gear 20 rotates in synchronization with the first driving-side rotating shaft 13 at the same speed and same direction. The first ring gear 22 is rotated and driven by the second driving-side rotating shaft 14 which is integrally provided with the output shaft of the second electric motor 11. Moreover, the number of teeth $z_{20}$ of the first sun gear 20 and the number of teeth $z_{22}$ of the first ring gear 22 are set so that the planet ratio $u_1 (=z_{22}/z_{20})$ of the first planetary gear transmission 16 is within the range of $2.80 \leq u_1 \leq 3.20$.

The second planetary gear mechanism 17 comprises a second carrier 23, a second sun gear 24, second planet gears 25a, 25b and a second ring gear 26. The second planetary gear mechanism 17 is a double pinion planetary gear mechanism in which the second planet gears 25a, 25b, which are supported by the second carrier 23 so as to be able to rotate, engage with each other to form a pair, and the plurality of second planet gears 25a placed on the inner diameter side engage with the second sun gear 24, and the plurality of second planet gears 25b placed on the outer diameter side engage with the second ring gear 26. Moreover, the second sun gear 24 is provided at the end section (left end section in FIG. 1) of the first driving-side rotating shaft 13, and is rotated and driven by the first driving-side rotating shaft 13 and the first sun gear 20. The second carrier 23 is supported so as to rotate in synchronization with the first ring gear 22 and second driving-side rotating shaft 14. The second ring gear 26 is supported so as transmit power to the driven-side rotating shaft 15. The number of teeth $z_{24}$ of the second sun gear 24 and the number of teeth $z_{26}$ of the second ring gear 26 are set so that the planet ratio $u_2 (=z_{26}/z_{24})$ of the second planetary gear transmission mechanism 17 is within the range of $1.90 \leq u_2 \leq 2.10$.

The one-way clutch 18 is located between the first carrier 19 and a portion 27 that is fastened to the vehicle. The one-way clutch 18 is released (disengaged) from the first carrier 19 when the first carrier 19 rotates in a specified direction, and is connected (engaged) with the first carrier 19 when the first carrier 19 tends to rotate in the direction opposite the specified direction. In other words, the one-way clutch 18 allows the first carrier 19 to rotate when the vehicle is traveling forward and the first carrier 19 rotates in the same direction that the driven-side rotating shaft 15 rotates, and prohibits the first carrier 19 from rotating when there is a tendency for the first carrier 19 to rotate in the opposite direction from the driven-side rotating shaft 15. The direction of rotation of the first carrier 19 is changed by appropriately controlling the direction of rotation and rotation speed of the first and second electric motors 10, 11, and thus the released/connected (engagement) state of the one-way clutch 18 is changed. In this specification, the rotation speed means the speed of rotation, and does not include the rotation direction.

When, based on the released/connected (engagement) state of the one-way clutch 18, there is a tendency for the first carrier 19 to rotate in the opposite direction from the specified direction, power is transmitted between the first sun gear 20 and the first ring gear 22. However, when the first carrier 19 rotates in the specified direction, power is not transmitted between the first sun gear 20 and the first ring gear 22. It is possible to use various kinds of clutches, such as a cam clutch, roller clutch, ratchet device and the like, as this kind of one-way clutch, however, in this example, a sprag clutch having a large engagement force, and that is capable of suppressing the occurrence of noise and vibration during idling is used.

The rotation transmission apparatus 3a is a typical gear transmission mechanism that combines a plurality of gears, and it transmits the rotation of the driven-side rotating shaft 15 of the planetary gear transmission 12 to the input section of a differential gear 8a, and the output shafts 9c, 9d of this differential gear 8a rotate and drive a pair of left and right drive wheels by way of a universal joint.

In the drive apparatus for an electric automobile of this example constructed as described above, the planetary gear transmission 12, by changing the released/connected (engagement) state of the one-way clutch 18 (rotation direction and rotation speed of the first and second electric motors 10, 11), the vehicle is operated in either a state where power is transmitted between the first sun gear 20 and the first ring gear 22 (state that achieves a low-speed mode), or a state wherein power is not transmitted between the first sun gear 20 and the first ring gear 22 (state that achieves a high-speed mode). In the following, each state will be explained.

Low-Speed Mode in which the One-Way Clutch is Connected

In this low-speed mode, as illustrated in FIG. 2, by suitably regulating the difference between the rotation direction and rotation speed of the output shaft of the first electric motor 10 that rotates and drives the first sun gear 20, and the output shaft of the second electric motor 11 that rotates and drives the first ring gear 22 and making the first carrier 19 tend to rotate in the opposite direction from the specified direction, the one-way clutch 18 is connected. The first carrier 19 is not able to rotate with respect to the portion 27 that is fastened to the vehicle. As a result, power is transmitted between the first sun gear 20 and the first ring gear 22 by way of the first planet gears 21. The transmission path of the power of the first and second electric motors 10, 11 in this kind of low-speed mode is as follows.

The power from the first electric motor 10 is inputted to the second sun gear 24 of the second planetary gear mechanism 17 by way of the first driving-side rotating shaft 13. The power that was inputted to the second sun gear 24 is transmitted over the two paths (A) and (B) described below, to the driven-side rotating shaft 15 and the first sun gear 20.

(A) First electric motor 10→first driving-side rotating shaft 13→second sun gear 24→second planet gears 25a, 25b→second ring gear 26→driven-side rotating shaft 15

(B) First electric motor 10→first driving-side rotating shaft 13→second sun gear 24→second planet gears 25a, 25b→second carrier 23→first ring gear 22→first planet gear 21→first sun gear 20

The power from the second electric motor is inputted to the first ring gear 22 of the first planetary gear mechanism 16 by way of the second driving-side rotating shaft 14. The power that was inputted to the first ring gear 22 is transmitted to the first sun gear 20 over the path (C) given below.

(C) Second electric motor→second driving side rotating shaft 14→first ring gear 22→first planet gears 21, 21→first sun gear 20

In the low-speed mode state, part of the power from the first and second electric motors 10, 11 is circulated inside the planetary gear transmission 12. In other words, the power that is transmitted to the first sun gear 20 over the path (B) and path (C) is inputted to the second sun gear 24 by way of the first driving-side rotating shaft 13. In this way, part of the power that was inputted to the second sun gear 24 is taken by the driven-side rotating shaft 15 by way of path (A), and transmitted again to the sun gear 20 by the remaining path (B). Therefore, in this low-speed mode state, by circulating part of the power, it is possible to increase the reduction radio of the planetary gear transmission 12.

In the low-speed mode state, when the vehicle is traveling at constant speed with no acceleration or deceleration (steady operation state) and the output torque of the first electric motor 10 is taken to be $\tau_{in1}$, and the output torque of the second electric motor 11 is taken to be $\tau_{in2}$, the torque $\tau_1$ that is inputted to the second sun gear 24 from the first driving-side rotating shaft 13, the torque $\tau_2$ that is inputted to the first sun gear 20 from the first planet gears 21, the torque $\tau_3$ that is inputted to the first ring gear 22 from the second carrier 23, and the rotation torque $\tau_{out}$ from the driven-side rotating shaft 15 are expressed by the following equations 1 to 4, respectively.

$$\tau_1 = \frac{\frac{z_{22}}{z_{20}}}{\frac{z_{22}}{z_{20}} - \frac{z_{26}}{z_{24}} + 1} \tau_{in1} + \frac{-1}{\frac{z_{22}}{z_{20}} - \frac{z_{26}}{z_{24}} + 1} \tau_{in2} \quad \text{[Equation 1]}$$

$$\tau_2 = \frac{\frac{z_{26}}{z_{24}} - 1}{\frac{z_{22}}{z_{20}} - \frac{z_{26}}{z_{24}} + 1} \tau_{in1} + \frac{-1}{\frac{z_{22}}{z_{20}} - \frac{z_{26}}{z_{24}} + 1} \tau_{in2} \quad \text{[Equation 2]}$$

$$\tau_3 = \frac{\frac{z_{22}}{z_{20}}\left(1 - \frac{z_{26}}{z_{24}}\right)}{\frac{z_{22}}{z_{20}} - \frac{z_{26}}{z_{24}} + 1} \tau_{in1} + \frac{-\left(1 - \frac{z_{26}}{z_{24}}\right)}{\frac{z_{22}}{z_{20}} - \frac{z_{26}}{z_{24}} + 1} \tau_{in2} \quad \text{[Equation 3]}$$

$$\tau_{out} = \frac{\frac{z_{22}}{z_{20}}\frac{z_{26}}{z_{24}}}{\frac{z_{22}}{z_{20}} - \frac{z_{26}}{z_{24}} + 1} \tau_{in1} + \frac{-\frac{z_{26}}{z_{24}}}{\frac{z_{22}}{z_{20}} - \frac{z_{26}}{z_{24}} + 1} \tau_{in2} \quad \text{[Equation 4]}$$

High-Speed Mode in which the One-way Clutch is Disconnected

In the high-speed mode, as illustrated in FIG. 3, the rotation direction and rotation speed of the output shaft of the first electric motor 10 that rotates and drives the first sun gear 20 and the output shaft of the second electric motor 11 that rotates and drives the first ring gear 22 are the same, and by rotating the first carrier 19 in the specified direction, the one-way clutch 18 is disconnected. The first carrier 19 is caused to rotate with respect to the portion 27 that is fastened to the vehicle. As a result, the first sun gear 20 and the first ring gear 22 rotate at the same speed and in the same direction, and power is not transmitted between the first sun gear 20 and the first ring gear 22. In this kind of high-speed mode, the power transmission paths from the first and second electric motors 10, 11 are as described below.

The power from the first electric motor 10 is inputted to the second sun gear 24 of the second planetary gear mechanism 17 by way of the first driving-side rotating shaft 13. The power that was inputted to the second sun gear 24, as indicated by (D) below, is transmitted to the driven-side rotating shaft 15 by way of a path that is the same as path (A) in the low-speed mode state.

(D) First electric motor 10→first driving-side rotating shaft 13→second sun gear 24→second planet gears 25a, 25b→second ring gear 26→driven-side rotating shaft 15

The power from the second electric motor 11 is inputted to the first ring gear 22 of the first planetary gear mechanism 16 by the second driving-side rotating shaft 14. The power that was inputted to the first ring gear 22 is transmitted to the driven-side rotating shaft 15 by the path given in (E) below.

(E) Second electric motor 11→second driving-side rotating shaft 14→first ring gear 22→second carrier 23→second planetary gear 25b→second ring gear 26→driven-side rotating shaft 15

In this way, power from the first and second electric motors 10, 11 is combined by the second planetary gear mechanism 17 and transmitted to the driven-side rotating shaft 15 without being transmitted between the first sun gear 20 and first ring gear 22 (without circulating inside the planetary gear transmission 12).

In this kind of high-speed mode state, except for when switching between the low-speed mode state and the high-speed mode state, the rotation direction and rotation speed of the first and second electric motors 10, 11 is the same. As a result, rotation of the first carrier 19, the first sun gear 20 and the first ring gear 22 of the first planetary gear mechanism 16, and the rotation direction and rotation speed of the revolution of each first planet gear 21 are the same, so essentially these first planet gears 21 do not rotate (one rotation per one revolution; there is no rotation with respect to the planet shaft provided in the first carrier 19), and the overall first planetary gear mechanism 16 rotates as one, or is in a so-called pasted state. Similarly, rotation of the second carrier 23, the second sun gear 24 and the second ring gear 26 of the second planetary gear mechanism 17, and the rotation direction and rotation speed of the revolution of the second planet gears 25a, 25b are the same, so essentially these second planet gears 25a, 25b do not rotate, and the overall second planetary gear mechanism 17 rotates as one.

In this case, the relationship between the output torque $\tau_{in1}$ of the first electric motor 10 and the output torque $\tau_{in2}$ and the rotation torque $\tau_{out}$ of the driven-side rotating shaft 15 indicated by the arrows in FIG. 3 is expressed by equation 5 below.

$$\tau_{out} = \tau_{in1} + \tau_{in2} \quad \text{[Equation 5]}$$

As described above, the relationship between the output torques $\tau_{in1}, \tau_{in2}$ of the first and second electric motors 10, 11 when the first and second planetary gear mechanisms 16, 17 are in the pasted state as described above is expressed by equation 6 below.

$$\tau_{in2} = \left(\frac{z_{26}}{z_{24}} - 1\right)\tau_{in1} \quad \text{[Equation 6]}$$

Figure 5:
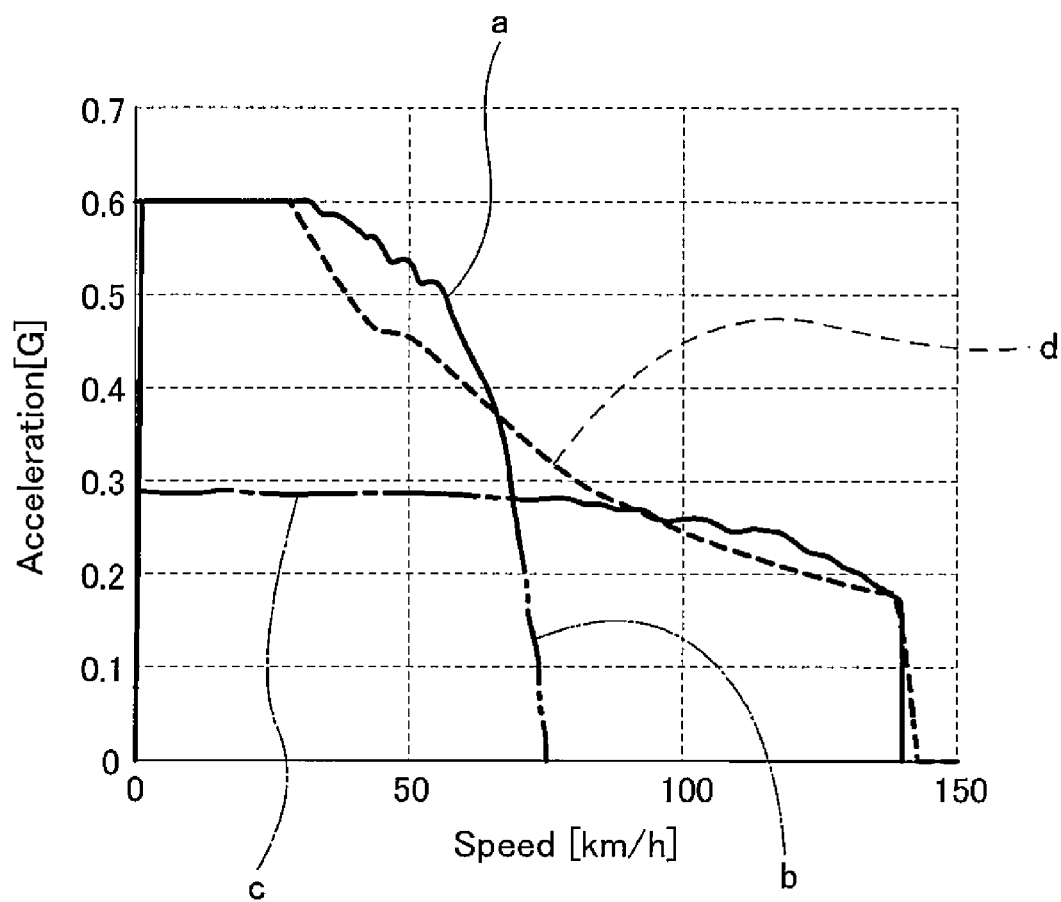
FIG. 5 is a graph for explaining the effect by assembling a transmission in a drive apparatus for an electric automobile.
Figure 6:
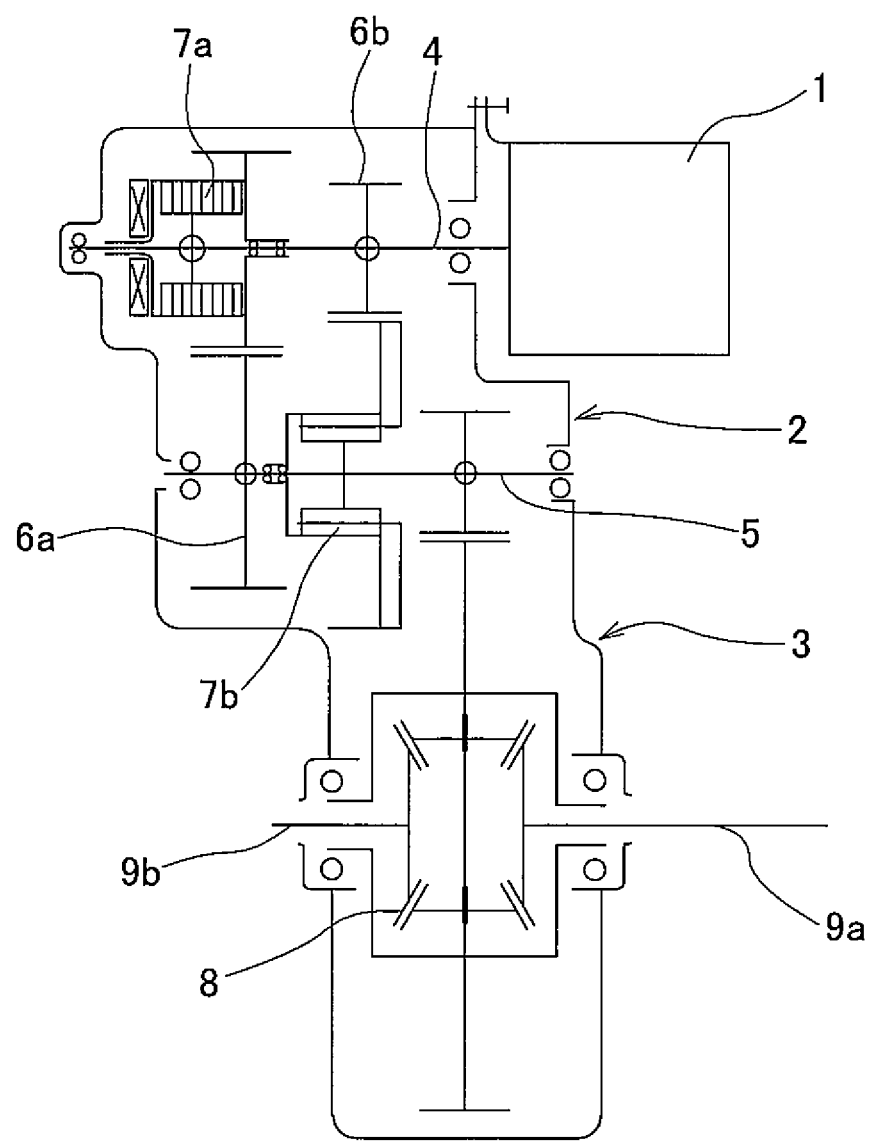
FIG. 6 is a cross-sectional view schematically illustrating a first example of conventional construction of a drive apparatus for an electric automobile.

Here, it is presumed that the planet ratios $u_1, u_2$ of the first and second planetary gear mechanisms 16, 17 are regulated with the ranges described above ($2.80 \leq u_1 \leq 3.20$, $1.90 \leq u_2 \leq 2.10$), the rotation directions of the first and second electric motors 10, 11 during steady operation in the low-speed mode are in opposite directions from each other, and the rotation torque of these motors 10, 11 is the same. As a result, the step ratio between the low-speed mode and the high speed mode, which is the total reduction ratio, which is the absolute value of the rotation torque of the driven-side rotating shaft 15 divided by the sum of the absolute values of the output torques of the first and second electric motors 10, 11 (calculated assuming no friction loss and transmission rate=100%), in the low-speed mode state divided by the total reduction ratio in the high speed mode (total reduction ratio in the low-speed mode/total reduction ratio in the high speed mode) is 2 or close to 2 (specifically, 1.8 to 2.2). In other words, in an electric motor for a typical electric automobile, the ratio of the maximum rotation speed when outputting the maximum torque and the maximum rotation speed of the electric motor is 1:2. On the other hand, in order to obtain the same traveling performance as a vehicle with a gasoline engine having a typical transmission, a ratio between the maximum speed when outputting the maximum torque and the total maximum speed of 1:4 is desired. Therefore, in the case of used a typical electric motor for an electric automobile, by presuming a relationship between the reduction ratio at low speed and the reduction ratio at high speed to be 2:1, a characteristic such as where the left half of the solid line "a" illustrated in FIG. 5 is made to be continuous with the right half of the solid line "a" is obtained, and the acceleration performance and high-speed performance of the vehicle can be made smooth close to that of a gasoline having a typical transmission as illustrated by the dashed line "d" in FIG. 5.

Moreover, the rotation speed of the driven-side rotating shaft 15 of the planetary gear transmission 12 is set from the rotation speed of the second sun gear 24, which is rotated and driven by the first electric motor 10 by way of the first driving-side rotating shaft 13, and the rotation speed of the second carrier 23, which is rotated and driven by the second electric motor 11 by way of the second driving-side rotating shaft 14. Therefore, with the rotation speed of the driven-side rotating shaft 15 a constant value, it is possible to make the angular speeds of the first sun gear 20 and the first ring gear 22 coincide while controlling the rotation speed and rotation direction of the outer shafts of the first and second electric motors 10, 11, and to smoothly change from the low-speed mode state illustrated in FIG. 2 to the high-speed mode state illustrated in FIG. 3. Similarly, it is possible to smoothly change from the high-speed mode state to the low-speed mode state.

With the drive apparatus for an electric automobile of this example, constructed as described above, it is possible to make this drive apparatus for an electric automobile more compact and lightweight, so it is possible to lengthen the distance traveled per charge, and thus improve the convenience of the electric automobile. In other words, the planetary gear transmission 12 selects the low-speed mode and high-speed modes having different reduction ratios by controlling the output (rotation speed and rotation direction) of the first and second electric motors 10, 11 and switching between the released and connected state for transmitting power between the first sun gear 20 and the first ring gear 22 by the one-way clutch 18. In this example, a one-way clutch 18, which is a sprag clutch, is used as the clutch for regulating the power transmission between the first sun gear 20 and the first ring gear 22, so there is no need to provide an actuator for changing the engagement state of the clutch. Therefore, it is possible to simplify the construction for changing between the low-speed mode and the high-speed mode, and it is possible to make the drive apparatus for an electric automobile in which the planetary gear transmission 12 is assembled more compact and lightweight.

Moreover, a planetary gear transmission 12 is used as the transmission, so it is possible to disperse and transmit power to a plurality of planet gears 21, 25a, 25b, and when compared with using a transmission that uses a typical gear mechanism, it is possible to make the transmission more compact. In addition, the first and second planetary gear mechanisms 16, 17 of the planetary gear transmission 12, and the first and second electric motors 10, 11 are arranged concentric with each other. Therefore, depending on the size and construction of these members 10, 11, 16, 17, the first and second planetary gear mechanisms 16, 17 can be placed on the inner-diameter side of the first and second electric motors 10, 11, and thus it is possible to make the drive apparatus for an electric automobile in which the planetary gear transmission 12 is assembled more compact.

Furthermore, in the operating state in the high-speed mode when the electric automobile is traveling at high speed (the rotation torque of the driven-side rotating shaft 15 is small and rotation speed is fast), the rotation directions and the rotation speeds of the first and second electric motors 10, 12 are made the same, and the first and second planetary gear mechanisms 16, 17 are in the pasted state. In other words, in the first planetary gear mechanism 16, power is not transmitted between the first sun gear 20 and the first ring gear 22 by way of the first planet gears 21. Similarly, in the second planetary gear mechanism 17 as well, power is not transmitted between the second sun gear 24 and the second ring gear 26 by way of the second planet gears 25a, 25b. Therefore, in the operating state in the high-speed mode, which occupies much of the time when the electric automobile is traveling, it is possible to reduce energy loss due to engagement between the gears of the first and second planetary gear mechanisms 16, 17, and thus it is possible to improve the efficiency of the drive apparatus for an electric automobile.

Moreover, by regulating the planet ratios $u_1$, $u_2$ of the first and second planetary gear mechanisms 16, 17 within the ranges ($2.80 \leq u_1 \leq 3.20$, $1.90 \leq u_2 \leq 2.10$) described above, and adjusting the output (rotation direction and size of rotation torque) of the first and second electric motors 10, 11 in the steady operating state in the low-speed mode, the step ratio between the low-speed mode and the high-speed mode (=total reduction ratio in the low-speed mode/total reduction ratio in the high-speed mode) is made to be 2 or near 2. As a result, in a drive apparatus for an electric automobile that uses a first and second electric motor 10, 11, the same performance is obtained as in gasoline-engine-driven automobile with a typical transmission, so it is possible to improve the acceleration performance and high-speed performance of the vehicle. In other words, the total reduction ratio (=absolute value of the rotation torque of the driven-side rotating shaft 15/sum of the absolute values of the output torques of the first and second electric motors 10, 11) in the steady operating state in the low-speed mode is as given in Table 1 below.

TABLE 1

| | | Planet Ratio ($u_1$) of Fisrt Planetary Gear Transmission Mechanism | | | | | | | | | | | | | | | |
|---|---|---|---|---|---|---|---|---|---|---|---|---|---|---|---|---|---|
| | | 2.00 | 2.10 | 2.20 | 2.30 | 2.40 | 2.50 | 2.60 | 2.70 | 2.80 | 2.90 | 3.00 | 3.10 | 3.20 | 3.30 | 3.40 | 3.50 |
| Planet | 1.50 | 1.500 | 1.453 | 1.412 | 1.375 | 1.342 | 1.313 | 1.286 | 1.261 | 1.239 | 1.219 | 1.200 | 1.183 | 1.167 | 1.152 | 1.138 | 1.125 |
| Ratio | 1.60 | 1.714 | 1.653 | 1.600 | 1.553 | 1.511 | 1.474 | 1.440 | 1.410 | 1.382 | 1.357 | 1.333 | 1.312 | 1.292 | 1.274 | 1.257 | 1.241 |
| ($u_2$) of | 1.70 | 1.962 | 1.882 | 1.813 | 1.753 | 1.700 | 1.653 | 1.611 | 1.573 | 1.538 | 1.507 | 1.478 | 1.452 | 1.428 | 1.406 | 1.385 | 1.366 |
| Second | 1.80 | 2.250 | 2.146 | 2.057 | 1.980 | 1.913 | 1.853 | 1.800 | 1.753 | 1.710 | 1.671 | 1.636 | 1.604 | 1.575 | 1.548 | 1.523 | 1.500 |
| Planetary | 1.90 | 2.591 | 2.454 | 2.338 | 2.239 | 2.153 | 2.078 | 2.012 | 1.953 | 1.900 | 1.853 | 1.810 | 1.770 | 1.735 | 1.702 | 1.672 | 1.644 |
| Gear | 2.00 | 3.000 | 2.818 | 2.667 | 2.538 | 2.429 | 2.333 | 2.250 | 2.176 | 2.111 | 2.053 | 2.000 | 1.952 | 1.909 | 1.870 | 1.833 | 1.800 |
| Trans- | 2.10 | 3.500 | 3.255 | 3.055 | 2.888 | 2.746 | 2.625 | 2.520 | 2.428 | 2.347 | 2.275 | 2.211 | 2.153 | 2.100 | 2.052 | 2.009 | 1.969 |
| mission | 2.20 | 4.125 | 3.789 | 3.520 | 3.300 | 3.117 | 2.962 | 2.829 | 2.713 | 2.613 | 2.524 | 2.444 | 2.374 | 2.310 | 2.252 | 2.200 | 2.152 |
| Mecha- | 2.30 | 4.929 | 4.456 | 4.089 | 3.795 | 3.555 | 3.354 | 3.185 | 3.039 | 2.913 | 2.803 | 2.706 | 2.619 | 2.542 | 2.473 | 2.410 | 2.352 |
| nism | 2.40 | 6.000 | 5.314 | 4.800 | 4.400 | 4.080 | 3.818 | 3.600 | 3.415 | 3.257 | 3.120 | 3.000 | 2.894 | 2.800 | 2.716 | 2.640 | 2.571 |

On the other hand, the total reduction ratio in the operating state in the high-speed mode (state where the rotation direction and rotation speed are the same for both the first and second electric motors 10, 11) is 1 (see equation 5, so the step ratio can be made to be 2 or near 2. The output torques from the first and second electric motors 10, 11 at this time satisfy the relationship of equation 6.

Moreover, changing between the low-speed mode and the high-speed mode that have different reduction ratios can be performed smoothly while controlling the rotation speed and rotation direction of the first and second electric motors 10, 11, so it is possible to reduce shifting shock due to fluctuation in torque, and thus it is possible to prevent giving an unpleasant feeling to the driver and passengers of the electric automobile.

Example 2

Figure 4:
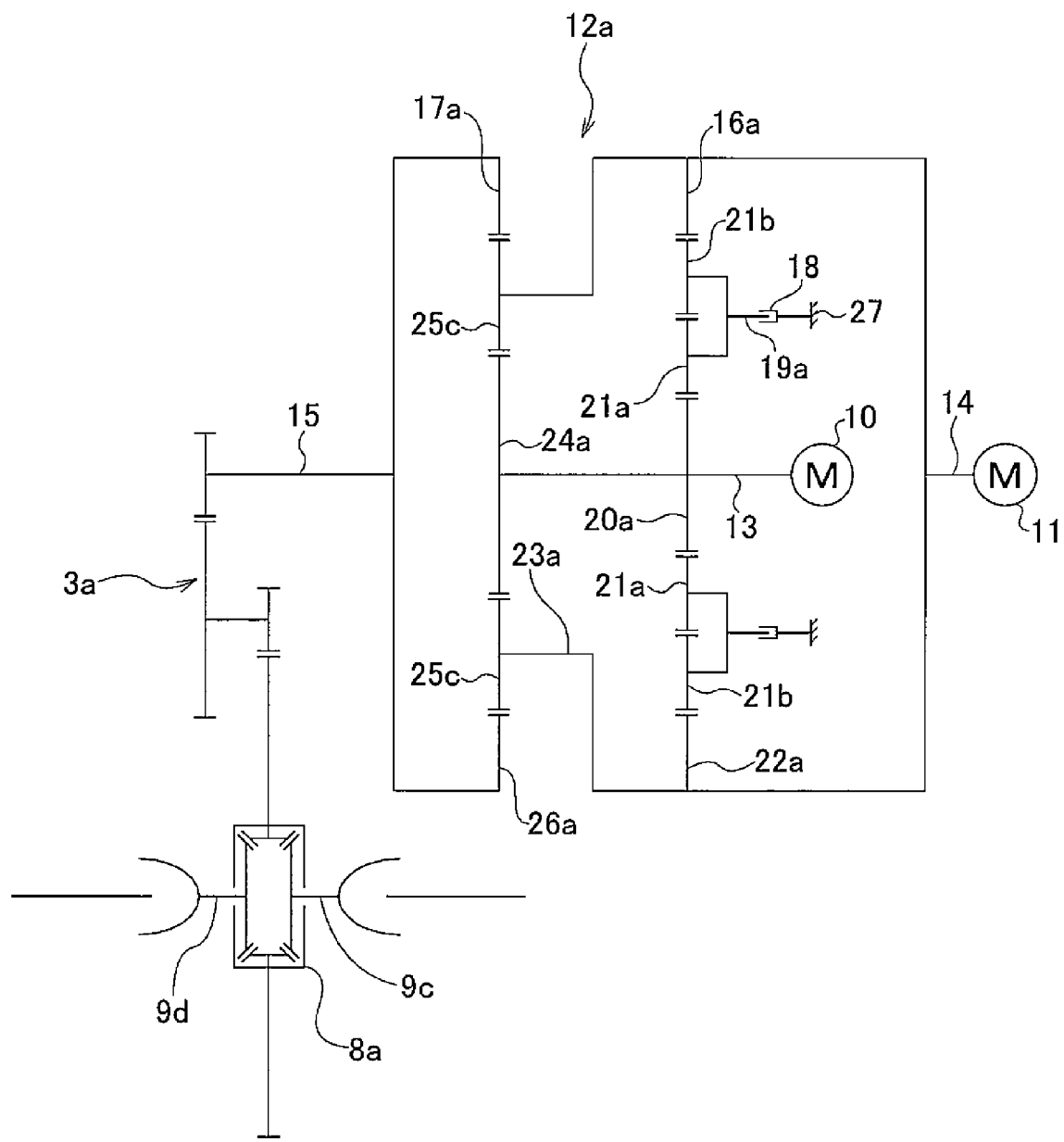
FIG. 4 is a cross-sectional view schematically illustrating a second example of an embodiment of the present invention.

FIG. 4 illustrates a second example of an embodiment of the present invention. In the planetary gear transmission 12a of this example, a first planetary gear mechanism 16a that is provided on the side of the first and second electric motors 10, 11 is a double pinion planetary gear mechanism in which the first planet gears 21a, 21b, which are supported by a first carrier 19a so as to be able to rotate, engage with each other to form a pair, and a plurality of first planet gears 21a placed on the inner diameter side engage with a first sun gear 20a, and a plurality of first planet gears 21b placed on the outer diameter side engage with a first ring gear 22a. Moreover, a second planetary gear mechanism 17a is a single pinion planetary gear mechanism in which a plurality of second planet gears 25c, which are supported by a second carrier 23a so as to be able to rotate, engage with both a second sun gear 24a and a second ring gear 26a. The construction and functions of the other parts are the same as in the first example of the embodiment, so the same reference numbers are used for identical parts, and any redundant explanations are omitted.

Specific Example 1

An example is given using concrete values for the torque of each part in the steady operating state in the low-speed mode illustrated in FIG. 2. First, the output torques $\tau_{in1}$, $\tau_{in2}$ of the first and second electric motors 10, 11, the number of teeth $z_{20}$, $z_{22}$ of the first sun gear 20 and the first ring gear 22 of the first planetary gear mechanism 16, and the number of teeth $z_{24}$, $z_{26}$ of the second sun gear 24 and the second ring gear 26 of the second planetary gear mechanism 17 are regulated as described below.

$\tau_{in1}$=50 (N/m)
$\tau_{in2}$=−50 (N/m)
$z_{20}$=24
$z_{22}$=76
$z_{24}$=47
$z_{26}$=97

Here, from equation 1 to equation 4, the torques for each part are as follows.

$\tau_1$=99.1 (N/m)
$\tau_2$=49.1 (N/m)
$\tau_3$=−105.4 (N/m)
$\tau_{out}$=204.5 (N/m)

When the sign for the torque is negative (minus), the direction of the torque (rotation direction) is opposite.

When embodying the drive apparatus for an electric automobile of the present invention, a reduction gear, such as a friction roller reduction gear, can be provided between one or both of the first and second electric motors and the input shaft on the driving side of the planetary gear transmission.

EXPLANATION OF THE REFERENCE NUMBERS

1 Electric motor
2 Transmission
3, 3a Rotation transmission apparatus
4 Driving-side rotating shaft
5 Driven-side rotating shaft
6a, 6b Gear transmission mechanism
7a, 7b Clutch mechanism
8, 8a Differential gear
9a to 9d Output shaft
10 First electric motor
11 Second electric motor
12, 12a Planetary gear transmission
13 First driving-side rotating shaft
14 Second driving-side rotating shaft
15 Driven-side rotating shaft
16, 16a First planetary gear mechanism
17, 17a Second planetary gear mechanism
18 One-way clutch
19, 19a First carrier
20, 20a First sun gear
21, 21a to 21b First planet gear
22, 22a First ring gear
23, 23a Second carrier
24, 24a Second sun gear
25a to 25c Second planetary gear
26, 26a Second ring gear
27 Portion fastened to the vehicle

What is claimed is:

1. A drive apparatus for an electric automobile, comprising:
   a pair of electric motors each having an output shaft;
   a planetary gear transmission having a first and second driving-side rotating shafts that are respectively rotated and driven by either one of the output shafts of the electric motors, and a driven-side rotating shaft; and
   a rotation transmission apparatus for transmitting the rotation of the driven-side rotating shaft of the planetary gear transmission to a pair of left and right drive wheels; wherein
   the planetary gear transmission further comprises first and second planetary gear mechanisms that are separated in the axial direction and are concentric with each other, and a clutch apparatus;
   the first planetary gear mechanism is a single-pinion planetary gear mechanism that comprises: a first carrier, a first sun gear, first planet gears and a first ring gear; the first planet gears being supported by the first carrier so as to be able to rotate and engaging with both the first sun gear and the first ring gear, in which the first sun gear is provided in the middle section in the axial direction of the first driving-side rotating shaft so as to be rotated and driven by the first driving-side rotating shaft, and the first ring gear is provided so as to be rotated and driven by the second driving-side rotating shaft;
   the second planetary gear mechanism is a double-pinion planetary gear mechanism that comprises: a second carrier, a second sun gear, second and third planet gears, and a second ring gear; the second and third planet gears being supported by the second carrier so as to be able to rotate and engaging with each other to form a pair; the second planet gears that are placed on the inner diameter side engaging with the second sun gear; and the third planet gears that are placed on the outer diameter side engaging with the second ring gear; in which the second sun gear is provided on the end section of the first driving-side rotating shaft so as to be rotated and driven by the first driving-side rotating shaft, the second carrier is provided so as to rotate in synchronization with the first ring gear, and the driven-side rotating shaft is rotated and driven by the second ring gear;
   the clutch apparatus changes between a state where the first carrier is prevented from rotating with respect to a portion that is fastened to the vehicle, and a state where the rotation of the first carrier is allowed; and
   in a low-speed mode state having a large reduction ratio, the clutch apparatus prevents the first carrier from rotating with respect to the portion fastened to the vehicle, and power that is inputted to the first ring gear is transmitted to the first sun gear, and in a high-speed mode state having a small reduction ratio, the clutch apparatus allows the first carrier to rotate with respect to the portion that is fastened to the vehicle, and power that is inputted to the first ring gear is not transmitted to the first sun gear.

2. The drive apparatus for an electric automobile according to claim 1, wherein, when the vehicle is traveling forward in the high-speed mode state, the rotation direction and rotation speed of the first and second electric motor are the same.

3. The drive apparatus for an electric automobile according to claim 1, wherein the step ratio of the planetary gear transmission, which is the total reduction ratio in the low-speed mode state divided by the total reduction ratio in the high-speed mode state, is within the range of 1.8 to 2.2.

4. The drive apparatus for an electric automobile according to claim 3, wherein, when the vehicle is traveling forward at a constant speed in the low-speed mode state, the rotation directions of the first and second electric motor are opposite each other, and the size of the rotation torque of the first and second electric motor can be made the same, and the planet ratio of the first planetary gear mechanism is no less than 2.8 and no greater than 3.2, and the planet ratio of the second planetary gear mechanism is no less than 1.9 and no greater than 2.1.

5. The drive apparatus for an electric automobile according to claim 3, wherein, when the vehicle is traveling forward at a constant speed in the low-speed mode state, the rotation directions of the first and second electric motor are opposite each other, and the size of the rotation torque of the first and second electric motor can be made the same, and the planet ratio of the first planetary gear mechanism is no less than 2.8 and no greater than 3.2, and the planet ratio of the second planetary gear mechanism is no less than 1.9 and no greater than 2.1.

6. A drive apparatus for an electric automobile, comprising:
   a pair of electric motors each having an output shaft;
   a planetary gear transmission having a first and second driving-side rotating shafts that are respectively rotated and driven by either one of the output shafts of the electric motors, and a driven-side rotating shaft; and
   a rotation transmission apparatus for transmitting the rotation of the driven-side rotating shaft of the planetary gear transmission to a pair of left and right drive wheels; wherein
   the planetary gear transmission further comprises first and second planetary gear mechanisms that are separated in the axial direction and are concentric with each other, and a clutch apparatus;
   the first planetary gear mechanism is a double-pinion planetary gear mechanism that comprises: a first carrier, a first sun gear, first and second planet gears, and a first ring gear; the first and second planet gears being supported by the first carrier so as to be able to rotate and engaging with each other to form a pair; the first planet gears that are placed on the inner diameter side engaging with the first sun gear; and the second planet gears that are placed on the outer diameter side engaging with the first ring gear; in which the first sun gear is provided in the middle section in the axial direction of the first driving-side rotating shaft so as to be rotated and driven by the first driving-side rotating shaft, and the first ring gear is provided so as to be rotated and driven by the second driving-side rotating shaft;
   the second planetary gear mechanism is a single-pinion planetary gear mechanism that comprises: a second carrier, a second sun gear, third planet gears; and a second ring gear; the third planet gears being supported by the second carrier so as to be able to rotate and engaging with both the second sun gear and the second ring gear; in which the second sun gear is provided on the end section of the first driving-side rotating shaft so as to be rotated and driven by the first driving-side rotating shaft, the second carrier is provided so as to rotate in synchronization with the first ring gear, and the driven-side rotating shaft is rotated and driven by the second ring gear;
   the clutch apparatus changes between a state where the first carrier is prevented from rotating with respect to a portion that is fastened to the vehicle, and a state where the rotation of the first carrier is allowed; and
   in a low-speed mode state having a large reduction ratio, the clutch apparatus prevents the first carrier from rotating with respect to the portion fastened to the vehicle, and power that is inputted to the first ring gear is transmitted to the first sun gear, and in a high-speed mode state having a small reduction ratio, the clutch apparatus allows the first carrier to rotate with respect to the portion that is fastened to the vehicle, and power that is inputted to the first ring gear is not transmitted to the first sun gear.

* * * * *